US009418060B1

(12) United States Patent
Winham et al.

(10) Patent No.: US 9,418,060 B1
(45) Date of Patent: Aug. 16, 2016

(54) SAMPLE TRANSLATION REVIEWS

(75) Inventors: Mark A. Winham, Seattle, WA (US); Daniel Leng, Seattle, WA (US); Mary Ellen Fullhart, Seattle, WA (US); Iliana C Sach, Seattle, WA (US); Chong Chung, Seattle, WA (US); Troy Fendall, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 845 days.

(21) Appl. No.: 13/424,147

(22) Filed: Mar. 19, 2012

(51) Int. Cl.
*G06F 17/28* (2006.01)
*G06F 17/00* (2006.01)

(52) U.S. Cl.
CPC .................................. *G06F 17/2854* (2013.01)

(58) Field of Classification Search
CPC .............. G06F 17/289; G06F 17/2827; G06F 17/2881; G06F 17/3043
USPC ............................................................ 704/2
See application file for complete search history.

(56) References Cited

U.S. PATENT DOCUMENTS

| | | | | |
|---|---|---|---|---|
| 6,980,953 | B1 * | 12/2005 | Kanevsky | G06F 17/289 |
| | | | | 704/2 |
| 8,140,322 | B2 * | 3/2012 | Simonsen et al. | 704/2 |
| 8,533,039 | B1 | 9/2013 | Winslade et al. | |
| 8,886,517 | B2 * | 11/2014 | Soricut et al. | 704/2 |
| 2003/0004885 | A1 | 1/2003 | Banerjee et al. | |
| 2004/0167768 | A1 * | 8/2004 | Travieso et al. | 704/2 |
| 2004/0236670 | A1 | 11/2004 | Hara | |
| 2006/0041503 | A1 | 2/2006 | Blair et al. | |
| 2006/0277332 | A1 * | 12/2006 | Yamashina | 710/62 |
| 2007/0050182 | A1 * | 3/2007 | Sneddon et al. | 704/2 |
| 2007/0192110 | A1 * | 8/2007 | Mizutani et al. | 704/277 |
| 2007/0192314 | A1 | 8/2007 | Heggem | |
| 2008/0140401 | A1 * | 6/2008 | Abrash | G09B 19/06 |
| | | | | 704/251 |
| 2008/0195372 | A1 * | 8/2008 | Chin | G06F 17/289 |
| | | | | 704/2 |
| 2009/0241115 | A1 * | 9/2009 | Raffo et al. | 718/100 |
| 2010/0241482 | A1 | 9/2010 | Knyphausen et al. | |
| 2011/0082684 | A1 * | 4/2011 | Soricut | G06F 17/289 |
| | | | | 704/2 |

OTHER PUBLICATIONS

Corinne McKay, Some thoughts on feedback and the translation process | Thoughts on Translation, Mar. 30, 2009.*
U.S. Appl. No. 12/464,026, "Data Mining for Targeted Republishing" filed May 11, 2009.
U.S. Appl. No. 12/464,053, "Data Mining for Targeted Republishing" filed May 11, 2009.
U.S. Appl. No. 13/168,661, "Literary Professional Match Making" filed Jun. 24, 2011.

(Continued)

*Primary Examiner* — Vincent P Harper
*Assistant Examiner* — Timothy Nguyen
(74) *Attorney, Agent, or Firm* — Lee & Hayes, PLLC

(57) ABSTRACT

Techniques for obtaining and utilizing a sample translation of a work and evaluating a translator are described herein. The techniques may include obtaining a translation a portion of a work from a translator of a specified level of experience. The translation may be sent to a reader and feedback may be received from the reader regarding the translation. A determination may be made as to whether to proceed with obtaining a complete translation of the work based on the feedback. In some instances, the translator may be evaluated based on the feedback.

29 Claims, 5 Drawing Sheets

(56) References Cited

OTHER PUBLICATIONS

U.S. Appl. No. 13/168,681, "Literary Professional Review and Reputation System" filed Jun. 24, 2011.

Anonymous, "Job shops bid for work online", Modem Machine Shop 73.11 (Apr. 2001) : 142, retrieved from ProQuestDirect on the Internet on Mar. 20, 2013, pp. 1-3.

Final Office Action for U.S. Appl. No. 13/168,661, mailed on Feb. 3, 2015, Mary Ellen Fullhart, "Literary Professional Match Making", 9 pages.

Office action for U.S. Appl. No. 13/168,661, mailed on Jan. 25, 2016, Fullhart et al., "Literary Professional Match Making", 18 pages.

Office action for U.S. Appl. No. 13/168,681, mailed on Oct. 20, 2015, Fullhart et al., "Literary Professional Review and Reputation System", 11 pages.

Final Office Action for U.S. Appl. No. 13/168,681, mailed on Mar. 6, 2014, Mary Ellen Fullhart, "Literary Professional Review and Reputation System", 9 pages.

Non-Final Office Action for U.S. Appl. No. 13/168,661, mailed on May 22, 2013, Mary Ellen Fullhart et al., "Literary Professional Match Making", 17 pages.

Office action for U.S. Appl. No. 13/168,661, mailed on Aug. 1, 2014, Fullhart et al., "Literary Professional Match Making", 7 pages.

Office action for U.S. Appl. No. 13/168,661, mailed on Sep. 18, 2015, Fullhart et al., "Literary Professional Match Making", 14 pages.

Office action for U.S. Appl. No. 13/168,681, mailed on Sep. 6, 2013, Fullhart et al., "Literary Professional Review and Reputation System", 13 pages.

Office action for U.S. Appl. No. 13/168,681, Fullhart et al., "Literary Professional Review and Reputation System", mailed on Apr. 15, 2016, 30 pages.

\* cited by examiner

SAMPLE TRANSLATION REVIEWS

BACKGROUND

Authors and publishers often translate a work (e.g., book, article, etc.) into another language in order to market the translated work to individuals of that language. The authors and publishers may initially invest in obtaining a complete translation of the work from an experienced translator, and thereafter, market the complete translation. However, in many instances a complete translation by an experienced translator requires a substantial investment. Additionally, a work may not translate well into another language, resulting in minimal acquisitions of the translated work.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
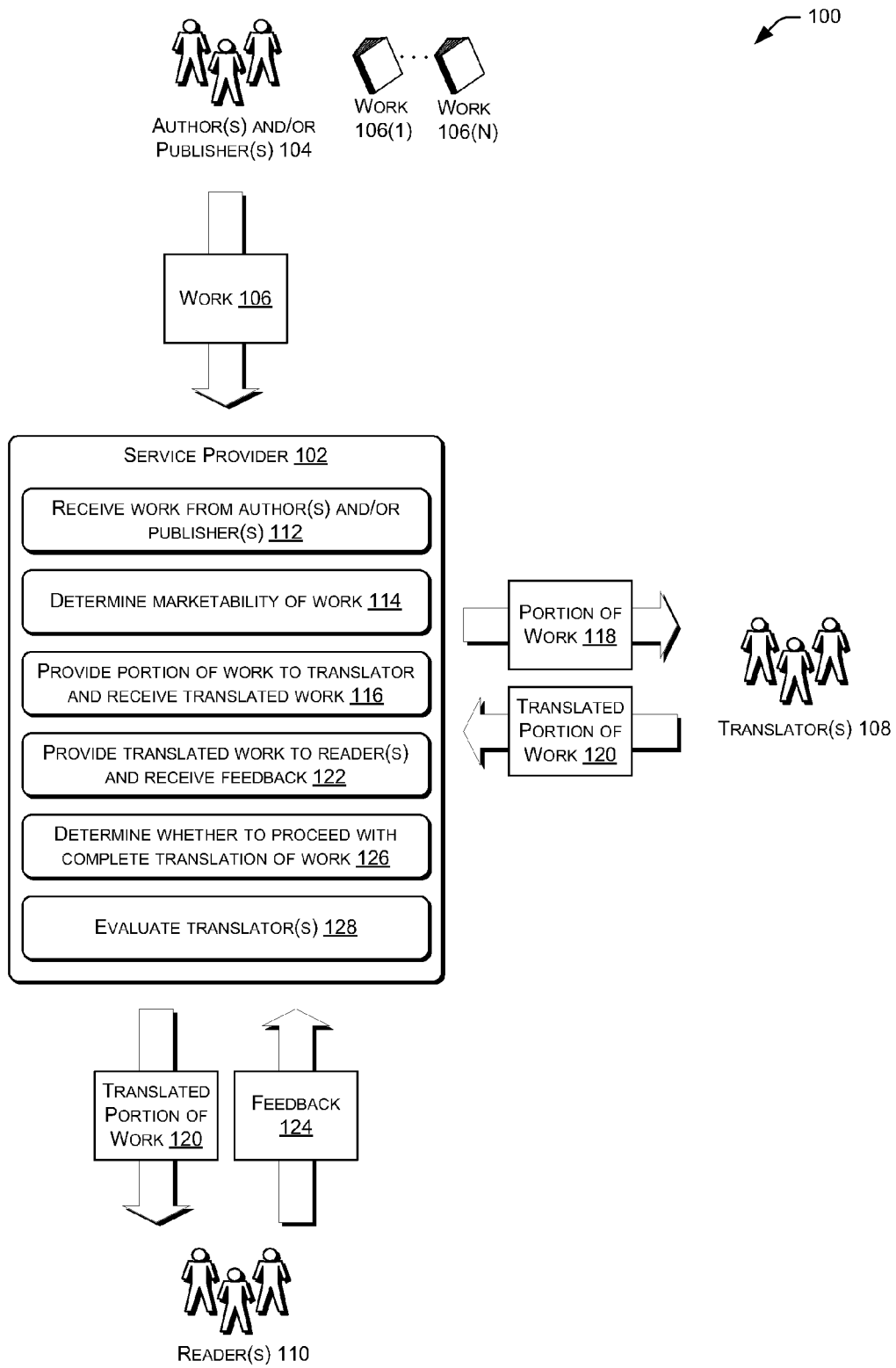
FIG. 1 illustrates an example architecture to obtain a translation a work from one or more translator of a specified level of experience, obtain feedback from one or more readers concerning the translated work, and determine whether to proceed with a complete translation of the work.

This disclosure describes architectures and techniques directed to, in part, obtaining a sample translation of a work from a translator to determine whether to obtain a complete translation of the work. In addition, this disclosure describes architectures and techniques directed to, in part, evaluating a translator based at least in part on feedback regarding a sample translation from the translator.

In particular implementations, a service provider may receive a work from an author or individual associated with an author (e.g., a publisher). Thereafter, a marketability of the work may be determined indicating a likelihood of acquisitions of the work in one or more markets. The marketability of the work may be based on many factors, such as an analysis of the work, interest level for a genre, author, and/or publisher of the work, previous acquisitions (e.g., purchases) of the work, and/or a value of another work that is similar to the work.

In some instances, the service provider and/or an individual associated with the service provider may determine whether the marketability of the work is greater than a marketability threshold. The marketability of the work may be greater than the marketability threshold when syntax of the work is a predetermined syntax, an average number of number of words per sentence, line, paragraph, and/or page of the work is less than or greater than a predetermined number, and/or an average complexity level of words used in the work is less than or greater than a predetermined complexity level. Alternatively, or additionally, the marketability of the work may be greater than the marketability threshold when an interest level for a genre associated with the work is greater than a threshold, when a number of previous acquisitions of the work is greater than a predetermined number, when an interest level for an author and/or publisher of the work is greater than a threshold, and/or when a value of another work which is similar to the work is greater than a threshold.

The service provider may provide (e.g., send) the work or portion of the work to one or more translators of a specified level of experience. For example, the work or portion of the work may be provided to one or more inexperienced translators. An "inexperienced translator" may generally refer to a translator having an experience level for translating into and/or out of a particular language that is less than a predetermined experience level. For example, an inexperienced translator may be a translator that does not have a substantial amount of practice in translating into and/or out of a particular language.

Meanwhile, an "experienced translator" may generally refer to a translator having an experience level for translating into and/or out of a particular language that is greater than a predetermined experience level. It should be understood that a translator may be an experienced translator in one language and an inexperienced translator in another language.

After receiving the work or portion of the work, the one or more translators may translate the work or portion of the work into one or more languages and send the translated work or portion of the work to the service provider. The translated work or portion of the work may comprise a sample translation. In some instances, the service provider may provide compensation to the one or more translators. For example, the compensation may include a standard fee that is previously established for translations by inexperienced translators and/or translations of a particular size. The standard fee may be less than a fee for obtaining a complete translation of a work.

A "complete translation" may generally refer to a translation of a substantial amount or an entirety of the work. In some instances, a complete translation is obtained through one or more experienced translators. While in other instances, a complete translation is obtained through one or more inexperienced translators. The one or more inexperienced translators may have initially translated a portion of the work.

The service provider may provide (e.g., send) the translated work or portion of the work to one or more readers to review. In some instances, the translated work or portion of the work may be made available to one or more readers that have previously reviewed one or more works. While in other instances, the work may be made available to one or more readers associated with an online site, such as users that interact with an online site.

The one or more readers may review (e.g., read) the translated work or portion of the work and provide feedback to the service provider. The feedback may include comments, annotations, consumption data, and so on. A comment may indicate an interest level of the one or more readers in the translated work or portion of the work. In some instances, the comments may be obtained through a survey that the one or more readers are requested to complete. An annotation may include notes, highlights, and the like, and may indicate an accuracy of a translation of a least a section of the translated work or portion of the work. Consumption data may be obtained as a reader reviews the translated work or portion of the work with the explicit knowledge and consent of the reader. Consumption data may include a reading rate, a reading duration, a number of pages accessed, and/or a stopping point in the translated work or portion of the work.

Thereafter, the service provider and/or an individual associated with the service provider (e.g., editor, reviewer, etc.) may determine whether to proceed with obtaining a complete translation of the work. For example, the service provider may determine whether to fund the complete translation. That is, whether the service provider, or an entity (e.g., company, organization, etc.) associated with the service provider, will pay for the complete translation. Here, the service provider and/or individual may utilize the feedback to determine a value of the work. When the value of the work is above a predetermined threshold, then the service provider and/or individual may proceed to obtain a complete translation of the work (e.g., fund the complete translation). In some instances, the complete translation may be obtained through one or more experienced translators. While in other instances, the complete translation is obtained through the one or more translators that initially translated the work or portion of the work. Here, the one or more translators may have initially translated a portion of the work without translating an entirety of the work.

Additionally, or alternatively, the service provider and/or an individual associated with the service provider may evaluate one or more translators based at least in part on the feedback. In some instances, the evaluation is utilized to update information associated with a translator and/or reward the translator. For example, if an evaluation indicates that a translated work or portion of the work satisfies one or more criteria, then an experience level associated with a translator of the work or portion of the work may be updated. Further, in some examples if an evaluation indicates that a translated work or portion of the work satisfies one or more criteria, then a translator may be rewarded with translating an entirety of the work (e.g., creating a complete translation).

In some instances, by obtaining a translation of a portion of the work (e.g., sample translation) and providing the translated portion of the work to one or more readers, feedback regarding the translated portion of the work may be obtained before proceeding to obtain a complete translation of the work. Further, in some instances by utilizing one or more inexperienced translators, a determination as to whether to proceed with obtaining a complete translation may be made in a relatively inexpensive manner. For example, a fee for a translation from one or more inexperienced translators may be less than a fee for a complete translation. Further, by utilizing an inexperienced translator, an individual may be given an opportunity to gain experience in translating and progress to become an experienced translator.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 to obtain a translation of a work or portion of the work from one or more translators of a specified level of experience, obtain feedback from one or more readers concerning the translated work or portion of the work, and determine whether to proceed with a complete translation of the work. The architecture 100 includes a service provider 102 that obtains a work, obtains a translation of the work (e.g., sample translation), and/or utilizes the translation of the work to determine whether to obtain a complete translation of the work and/or to evaluate a translator.

The architecture 100 may include one or more authors and/or publishers 104 associated with one or more works 106(1) . . . 106(N) (collectively referred to as one or more works 106). The one or more works 106 may include one or more books, newspapers, magazines, articles, pieces of art, or other works. The one or more authors and/or publishers 104 may provide the one or more works 106 to the service provider 102.

The architecture 100 may also include one or more translators 108 to translate one or more works and provide the one or more translated works to the service provider 102. The one or more translators 108 may comprise one or more inexperienced translators. In some instances, the one or more translators 108 may have registered as being an inexperienced translator through an online site, such as an online marketplace.

In some instances, an online marketplace may include a community where authors, translators, publishers, reviewers, readers, and/or other individuals can interact. For example, an online marketplace may link translators with translation opportunities from authors and/or publishers. The online marketplace may allow a translator to bid on a translation opportunity. That is, a translator may be given the opportunity to translate a work when a bid from the translator is accepted. In some instances, the service provider 102 is associated with the online marketplace.

As discussed above, an "inexperienced translator" may generally refer to a translator having an experience level for translating into and/or out of a particular language that is less than a predetermined experience level. For example, a translator may be considered an inexperienced translator if the translator has performed less than a threshold number of translations into and/or out of a particular language, if the translator has been translating into and/or out of a particular language for a period of time that is less than a threshold period of time, if the translator lacks particular training and/or certification, and so on. In some instances, a translator may be considered inexperienced in particular genre. For example, if a translator has performed less than a threshold number of translations in a particular genre, then the translator may be considered inexperienced in that particular genre.

Additionally, or alternatively, an inexperienced translator may be based on one or more recommendations. For example, if an individual is recommended to be a translator, then the individual may be given the opportunity to register as an inexperienced translator with, for example, an online site, such as an online marketplace of the service provider 102.

Meanwhile, as discussed above, an experienced translator may generally refer to a translator having an experience level for translating into and/or out of a particular language that is greater than a predetermined experience level. For example, a translator may be considered an experienced translator if the translator has performed more than a threshold number of translations into and/or out of a particular language, if the translator has been translating into and/or out of a particular language for a period of time that is more than a threshold period of time, if the translator has particular training and/or certification, and so on. In some instances, a translator may be considered experienced in particular genre. For example, if a translator has performed more than a threshold number of translations in a particular genre, then the translator may be considered experienced in that particular genre. It should be understood that a translator may be an experienced translator into and/or out of one language and an inexperienced translator into and/or out of another language.

In addition, the architecture 100 may include one or more readers 110 to review translated works translated by the one or more translators 108 and provide feedback to the service provider 102. In some instances, the one or more readers 110 include one or more readers that have previously reviewed one or more works. For example, the one or more readers 110 may be established reviewers that regularly review works. While in other instances, the one or more readers 110 may include users associated with an online site. For example, the one or more readers 110 may include any user that is informed through an online site of a work that is available to be reviewed.

Although not illustrated in FIG. 1, the service provider 102, one or more authors and/or publishers 104, one or more translators 108, and/or one or more readers 110 may each be associated with and/or include one or more computing devices, such as one or more laptop computers, desktop computers, servers, smart phones, electronic reader devices, mobile handsets, personal digital assistants (PDAs), portable navigation devices, portable gaming devices, tablet computers, portable media players, other client devices, and the like. Each computing device may be configured to communicate between the service provider 102, one or more authors and/or publishers 104, one or more translators 108, and/or one or more readers 110.

In an illustrative implementation, at 112, the service provider 102 may receive the one or more works 106 from the one or more authors and/or publishers 104. For example, the one or more authors and/or publishers 104 may provide the one or more works 106 by uploading the one or more works 106 to an online site associated with the service provider 102, emailing the one or more works 106 to the service provider 102, sending a transcript of the one or more works 106 to the service provider 102, or otherwise distributing an electronic and/or paper copy of the one or more works 106 to the service provider 102. In some instances, the one or more works 106 may be provided to the service provider 102 through an online marketplace associated with the service provider 102.

At 114, the service provider 102 may determine a marketability of the one or more works 106. The marketability of the one or more works 106 may indicate a likelihood of acquisitions of the one or more works 106 if translated and marketed in one or more markets. For example, a marketability of a work may indicate that the work will experience a predetermined number of acquisitions if the work is translated into a particular language and offered for acquisition in a particular market associated with the particular language. As used herein, an acquisition of a work may be achieved through purchasing, renting, borrowing, trading, bartering, or otherwise acquiring the work. A market may refer to one or more geographic regions (e.g., countries, states, cities, counties, etc.) and/or individuals associated with the one or more geographic regions.

In some instances, the service provider 102 may select a particular market in which to determine a marketability of a work. For example, the service provider 102 may focus on a market which has historically provided a threshold number of acquisitions for works and/or a market associated with a threshold number of individuals. Additionally, or alternatively, the service provider 102 may focus on a market specified by an author and/or publisher. Further, in some instances the marketability may be determined at least in part by one or more individuals associated with the service provider 102, such as editors, reviewers, and the like.

A marketability of a work may be based on many factors, such as an analysis of the work, interest level for a genre associated with the work, interest level for an author and/or publisher of the work, previous acquisitions (e.g., purchases) of the work, and/or a value of another work that is similar to the work.

For example, a marketability of a work may be determined by analyzing one or more portions of a work. The analysis may identify syntax of a least a portion of the work, such as organization of words and/or phrases within a sentence, a relationship between words and/or phrases within a sentence, and so on. The analysis may also identify a number of words per sentence, line, paragraph, and/or page (e.g., an average number of words), a complexity level of words utilized in the work (e.g., an average complexity level), and so on. The analysis may indicate an ease of translating the work into another language. In some instances, the analysis may include performing tokenization of text using software, calculating and recording metadata of tokens and token relationships using literature scoring functions and dictionaries (e.g., performed with software), etc.

Additionally, or alternatively, the marketability of a work may be determined by determining an interest level for a genre associated with the work. The interest level may be based on previous acquisitions of works associated with the genre. In addition, the marketability of a work may be determined by determining an interest level for an author and/or publisher of the work. The interest level for the author and/or publisher may be based at least in part on acquisitions of works of the author and/or publisher.

Further, in some instances a marketability of a work may be determined by determining a number of previous acquisitions (e.g., purchases) of the work. Here, the work may have previously been offered for acquisition in another language. The marketability of a work may also be determined by determining a value of another work that is similar to the work. The other work may have previously been translated into another language. The value of the other work may be determined from acquisitions of the other work. The similarity may be based on a threshold number of similar characteristics, such as genre, author, publisher, language that a work was initially authored in, and so on.

After a marketability of the one or more works 106 is determined, the service provider 102 may determine whether the marketability is greater than a marketability threshold. The marketability of the one or more works 106 may be greater than the marketability threshold when, for example, an analysis of the one or more works 106 indicates that syntax of the one or more works 106 is a predetermined syntax (e.g., syntax that is more suited for translation in comparison to other syntaxes), an average number of number of words per sentence, line, paragraph, and/or page of the one or more works 106 is less than or greater than a predetermined number, and/or an average complexity level of words used in the one or more works 106 is less than or greater than a predetermined complexity level.

Alternatively, or additionally, the marketability of the one or more works 106 may be greater than the marketability threshold when an interest level for a genre associated with the one or more works 106 is greater than a threshold, when a number of previous acquisitions (e.g., purchases) of the one or more works 106 is greater than a predetermined number, when an interest level for an author and/or publisher of the one or more works 106 is greater than a threshold, and/or when a value of another work which is similar to the one or more works 106 is greater than a threshold.

In some instances, the service provider 102 may determine a marketability of the one or more works 106 in multiple markets and determine whether the marketability of the one or more works 106 is greater than the marketability threshold for any of the markets. Here, the determination may indicate one or more markets in which the one or more works 106 are marketable. The service provider 102 may proceed to obtain translations of the one or more works 106 in languages associated with these markets.

Further, in some instances the service provider 102 may determine a marketability of the one or more works 106 in a particular market selected by the service provider 102 and/or specified by the one or more authors and/or publishers 104. Here, the service provider 102 may determine whether the marketability of the one or more works 106 in the particular market is greater than a marketability threshold for the particular market.

When the marketability of the one or more works 106 is less than the marketability threshold, the service provider 102 may inform the one or more authors and/or publishers 104 that the one or more works 106 do not meet an initial level of marketability. The one or more authors and/or publishers 104 may be informed in a notification, such as an email, text message, letter, telephone call, etc. In some instances, the service provider 102 may provide the one or more authors and/or publishers 104 the opportunity to proceed by allowing the one or more authors and/or publishers 104 to fund the translation (e.g., sample translation). That is, the one or more authors and/or publishers 104 may proceed with translation upon payment of a fee. In other instances, the service provider 102 may inform the one or more authors and/or publishers 104 that the service provider 102 will not proceed with translation.

When the marketability of the one or more works 106 is greater than the marketability threshold, the service provider 102 may proceed with translation of the one or more works through the one or more translators 108. At 116, the service provider 102 may provide (e.g., send) a portion of one of the one or more works 106 (hereinafter portion of the work 118) to the one or more translators 108. As discussed above, the one or more translators 108 may comprise one or more inexperienced translators. The portion of the work 118 may be provided to one or more translators that are able to translate into and/or out of a language associated with a market where the marketability of the one or more works 106 is determined to be greater than a marketability threshold.

The service provider 102 may provide the portion of the work 118 by making the portion of the work 118 available through, for example, an online site, a notification (e.g., email, text message, etc.), and so on. In some instances, the portion of the work 118 may be sent to a computing device associated with the one or more translators 108, such as a tablet device, laptop computer, etc.

Additionally, or alternatively, in some instances the portion of the work 118 is made available to a translator in a list that includes other portions of works that are available to be translated. For example, the portion of the work 118 may be made available in a listing on an online marketplace, such as the online marketplace discussed above. This may allow a translator to choose a particular portion of a work to translate.

The portion of the work 118 may comprise a beginning portion of the one or more works 106 defined at least partly by one or more breaks in the one or more works 106, such as a chapter, page, or other section break in the one or more works 106. Although the service provider 102 in the following discussion provides a portion of one of the one or more works 106, in some instances the service provider 102 may provide an entirety of one of the one or more works 106.

In some instances, the service provider 102 may select a number of translators from a pool of translators of a specified level of experience (e.g., inexperienced translators). The portion of the work 118 may be made available to the selected translators of the pool of translators. For example, a translator may be selected based at least in part on a quality of a sample work written by the translator, a resume associated with the translator, a date when the translator will be able to translate the portion of the work 118, a compensation requested by the translator for translating the portion of the work 118, a recommendation from an individual, a native language of the translator, a language that the translator may translate into and/or out of, and so on. A recommendation may originate from an individual having a threshold level of experience in publishing, an individual or an entity associated with the service provider 102 or another service provider, and/or a translator of a higher level of experience than the translator. In some instances, a recommendation may originate from an experienced translator and allow an inexperienced translator to begin translating.

Additionally, or alternatively, a translator may be selected based at least in part on an experience level of the translator. For example, if the service provider 102 wishes to utilize translators of a particular level of experience for works of a particular level of complexity, the service provider 102 may select a translator that is associated with the particular level of experience. This may allow a service provider to obtain translations of more complex works from translators with more experience.

In some instances, the portion of the work 118 may be made provided to be translated into multiple languages. That is, the portion of the work 118 may be provided to one or more translators that are capable of translating into and/or out of multiple languages. The multiple languages may be associated with markets where the marketability of the one or more works 106 is greater than a marketability threshold. In other instances, the portion of the 118 may be provided to be translated into a single language.

After the one or more translators 108 translate the portion of the work 118, the translated portion of the work 118 (hereinafter translated portion of the work 120) may be provided to the service provider 102. For example, the translated portion of the work 120 may be uploaded through an online site, sent in a notification (e.g., email, text message, mail, etc.), and so on. The translated portion of the work 120 may comprise a sample translation. Although the one or more translators 108 in the following discussion provide a translation of a portion of the one or more works 106, in some instances the one or more translators 108 may provide a translation of an entirety of the one or more works 106.

In some instances, the service provider 102 may provide (e.g., send) compensation to a translator that translated the portion of the work 118. The compensation may include, for example, a standard fee that is previously established for translations by inexperienced translators and/or translations of a particular size (e.g., a predetermined number of pages, chapters, etc.). The standard fee may be less than a fee for obtaining a complete translation of a work. The compensation may alternatively, or additionally, include a royalty based on acquisitions of a complete translation of the one more works 106, a voucher (e.g., a voucher code) for a work that has already been published as a complete translation, a voucher to return for a complete translation of the one or more works 106, attribution on a detail page, printed title page (e.g., credits), or another page of a complete translation of the one or more works 106, a gift card, and/or reputation points. Attribution may include acknowledging a translator by listing a name of the translator. In some instances, the compensation originates from the service provider 102, while in other instances the service provider 102 receives the compensation from the one or more authors and/or publishers 104 and forwards the compensation to the translator.

In some instances, a particular form of compensation provided to a translator may be more appropriate than another form of compensation. For example, a standard fee may be more appropriate than another form of compensation (e.g., attribution) in accordance with established business practices. However, it should be understood that any form of compensation discussed above may be provided to a translator.

At 122, the service provider 102 may provide (e.g., send) the translated portion of the work 120 to the one or more readers 110. For example, the translated portion of the work 120 may be made available to the one or more readers 110 through, for example, an online site, a notification (e.g., email, text message, etc.), and so on. In some instances, the translated portion of the work 120 may be sent to a computing device associated with the one or more readers 110, such as a tablet device, laptop computer, etc. Additionally, or alternatively, in some instances the translated portion of the work 120 may be made available in a listing that includes other translated portions of works, such as in a listing on an online marketplace. This may allow a reader to choose a particular portion of a work to review.

In some instances, the translated portion of the work 120 may be made available to a select number of readers. The select number of readers may comprise an established pool of readers within a predetermined range. For example, the service provider 102 may select a particular number of readers that regularly review works (e.g., review a threshold number of works during a predetermined time period). In some instances, the service provider 102 may select a reader based at least in part on a level of detail of a review previously prepared by the reader. For example, a reader may be selected if the reader has previously provided a review that is associated with a threshold level of detail based on a number of words and/or level of analysis provided in the review.

Additionally, or alternatively, the translated portion of the work 120 may be made available to any number of users of an online site. For example, the translated portion of the work 120 may be listed on an online marketplace and/or online retail site for one or more users to review. The one or more users may view and/or download the translated portion of the work 120. By doing so, the translated portion of the work 120 may be reviewed by general users of an online site.

In some instances, the service provider 102 may provide a computing device to a reader to utilize to review the translated portion of the work 120. Here, a computing device (e.g., tablet device, laptop computer, etc.) may be given to a reader and/or loaned to the reader for a predetermined time period. Thereafter, the translated portion of the work 120 may be sent to the computing device. By doing so, the service provider 102 may incentivize a reader to review one or more translated portions of works.

In some instances, a predetermined number of translated portions of works are made available to a reader. That is, the reader may review a predetermined number of translated portions of works at one time. Here, a reader may check-out a translated portion of a work and check-out another translated portion of a work when the translated portion of the work is checked-in.

After providing the translated portion of the work 120 to the one or more readers 110, the translated portion of the work 120 may be reviewed by the one or more readers 110. Based at least in part on the review, the one or more readers 110 may provide (e.g., send) feedback 124 to the service provider 102. The feedback 124 may include comments, annotations, consumption data, and so on.

A comment may indicate an interest level of the one or more readers 110 in the translated portion of the work 120. In some instances, the comments may be obtained through a survey that the one or more readers 110 are requested to complete. A survey may include questions to verify that the one or more readers 110 reviewed the translated portion of the work 120 and/or to request an interest level of the one or more readers 110 in the translated portion of the work 120. In some instances, a survey may also include information about the translation, such as an accuracy of the translated portion of the work 120. If a reader has reviewed only a section of the translated portion of the work 120, the survey may also indicate a reason that the reader only reviewed the section of the translated portion of the work 120. In some instances, a reader may be required to complete a survey before another translated portion of a work may be checked-out.

Meanwhile, annotations may include notes, highlights, and the like. In some instances, the annotations may indicate a translation accuracy of a least a section of the translated portion of the work 120. Further, in some instances annotations tools may be available to the one or more readers 110 to provide notes, highlights, or other annotations in the translated portion of the work 120. The annotation tools may be provided through an interface accessed on a computing device and/or through an online site. This may allow a reader to identify sections of the translated portion of the work 120 that the reader may find interesting and/or sections of the translated portion of the work 120 that may include an inaccurate translation.

Further, consumption data may be obtained as a reader reviews the translated portion of the work 120. The consumption data may include a reading rate through one or more sections of the translated portion of the work 120, a reading duration through one or more sections of the translated portion of the work 120, a number of pages accessed by the reader, and/or a stopping point in the translated portion of the work 120. In some instances, the consumption data may indicate an interest level of a reader in the translated portion of the work 120 and/or indicate whether the reader actually reviewed the translated portion of the work 120.

It should be understood that consumption data is obtained with the explicit knowledge and consent of a reader. As such, a reader may be provided the option of opting out of generating consumption data and/or providing consumption data to a service provider.

In some instances, the service provider 102 may provide (e.g., send) compensation to the one or more readers 110 after receiving feedback from the one or more readers 110. The compensation may include a royalty based on acquisitions of a complete translation of the one more works 106, a standard fee that is previously established for reviewing a work, a voucher (e.g., a voucher code) for a work that has already been published as a complete translation, a voucher to return for a complete translation of the one or more works 106, attribution on a detail page, printed title page (e.g., credits), or another page of a complete translation of the one or more works 106, a gift card, and/or reputation points. Attribution may include acknowledging a reader that reviewed the translated portion of the work 120, such as listing a name of the reader. Meanwhile, in other instances the service provider 102 may not provide compensation to the one or more readers 110.

In some instances, a particular form of compensation provided to a reader may be more appropriate than another form of compensation. For example, a voucher or attribution may be more appropriate than another form of compensation (e.g., standard fee) in accordance with established business practices. However, it should be understood that any form of compensation discussed above may be provided to a reader.

At 126, the service provider 102 may determine whether to proceed with obtaining a complete translation of the one or more works 106 (e.g., determine whether to fund the complete translation). In some instances, the determination may be made at least in part by one or more individuals associated with the service provider 102, such as editors, reviewers, and the like. Here, the service provider 102 may provide the feedback from the one or more readers 110 so that the one or more individuals can make the determination.

The determination at 126 may include determining a value of the one or more works 106 based at least in part on the feedback from the one or more readers 110. The determination may also be based on one or more of the factors utilized to determine a marketability of the one or more works 106, such as an analysis of the one or more works 106, interest level for a genre associated with the one or more works 106, previous acquisitions of the one or more works 106, interest level for an author and/or publisher of the one or more works 106, and/or a value of another work that is similar to the one or more works 106.

When the determined value of the one or more works 106 is less than a threshold, then the service provider 102 may inform the one or more authors and/or publishers 104 that the service provider 102 will not proceed to obtain a complete translation of the one or more works 106. That is, the one or more authors and/or publishers 104 may be informed that the service provider 102 and/or an entity associated with the service provider 102 (e.g., company, organization, etc.) will not fund (e.g., pay for) the complete translation. In some instances, the one or more authors and/or publishers 104 may then be given the option to fund the complete translation and the service provider 102 may proceed with obtaining a complete translation with funds from the one or more authors and/or publishers 104. Further, in some instances, the one or more authors and/or publishers 104 may proceed to obtain a complete translation of the one or more works 106 through other means, such as an online marketplace.

When the determined value of the one or more works 106 is greater than a threshold, then the service provider 102 may proceed to obtain a complete translation of the one or more works 106. That is, the service provider 102 and/or an entity associated with the service provider 102 may fund the complete translation of the one or more works. In some instances, the complete translation may be obtained through one or more experienced translators. While in other instances, the complete translation is obtained through the one or more translators 108 that initially translated the portion of the work 118. Here, the one or more translators 108 may have initially translated a portion of the one or more works 106 without translating an entirety of the one or more works 106.

In some instances, the service provider 102 may cause publishing and/or copyright rights of the one or more works 106 to be acquired when the service provider 102 determines to proceed with obtaining a complete translation of the one or more works 106. While in other instances, the service provider 102 may proceed with obtaining a complete translation without acquiring such rights.

After a complete translation of the one or more works 106 is obtained, the service provider 102 may cause the completed one or more works 106 to be published. For example, the service provider 102 may provide the completed one or more works 106 back to the one or more authors and/or publishers 104 to be published. Alternatively, or additionally, the service provider 102 may publish the completed one or more works 106 through, for example, an online site associated with the service provider 102 (e.g., online retail site, online marketplace, etc.).

Meanwhile, at 128, the service provider 102 may evaluate the one or more translators 108 based at least in part on the feedback 124 from the one or more readers 110. In some instances, the evaluation may be made at least in part by one or more individuals associated with the service provider 102, such as editors, reviewers, and the like. The evaluation may indicate an accuracy of translations in the translated portion of the work 120 for a particular translator.

In some implementations, feedback for a particular translator from multiple readers is normalized before the particular translator is evaluated. In other instances, the feedback is not normalized. By normalizing the feedback, a more accurate evaluation of the particular translator may be made.

In some instances, a translator of the one or more translators 108 is evaluated based on a value of the one or more works 106 in a non-translated form. For example, a work in a non-translated form may be given a particular value (e.g., market value) based on previous acquisitions of the work. A portion of the work is then translated and reviewed by a reader. The reader provides feedback indicating a value for the translated portion of the work that is less than the particular value given for the non-translated work. If, for example, there is a large difference (e.g., difference above a threshold) between the particular value for the non-translated work and the translation of the portion of the work, then this may indicate that a low quality translation was obtained by the translator (e.g., low quality with respect to a predetermined quality level). Here, the evaluation may indicate that a relatively poor quality translation was obtained from the translator.

In some instances, the evaluation may be utilized to update information associated with a translator. For example, if an evaluation indicates that a translated portion of a work satisfies one or more criteria, then an experience level associated with a translator that performed the translation may be updated to a higher level than was previously associated with the translator. For example, the translator may be updated from an inexperienced translator to an experienced translator. The one or more criteria may be satisfied when a threshold number of readers rate the translator above a predetermined threshold.

If, however, an evaluation indicates that a translated portion of a work does not satisfy one or more criteria (e.g., poor quality translation), then an experience level associated with a translator that performed the translation may be updated to a lower level than was previously associated with the translator. In some instances, the translator may be completely removed from a list of inexperienced translators. Meanwhile, if an evaluation does not indicate whether a translated portion of a work satisfies one or more criteria, then the translator may continue translating.

In some instances, a translator may be updated to a particular tier within an inexperienced level. Here, an inexperienced level may have multiple tiers of experience, such that an inexperienced translator may move up or down a tier and still be considered an inexperienced translator. Each tier may allow an inexperienced translator to perform different functions. For example, an entry tier may allow the inexperienced translator to perform translations of works that are associated with a low complexity level, while a higher tier may allow the inexperienced translator to perform translation of works that are associated with a high complexity level. Further, in some instances the higher tier may allow the inexperienced translator to mentor other inexperienced translators of lower tiers.

Additionally, or alternatively, the evaluation may be utilized to reward a translator. The reward may include allowing the translator to translate an entirety of the one or more works 106 (e.g., create a complete translation). Here, the translator may additionally be updated to an experienced translator.

Example System

Figure 2:
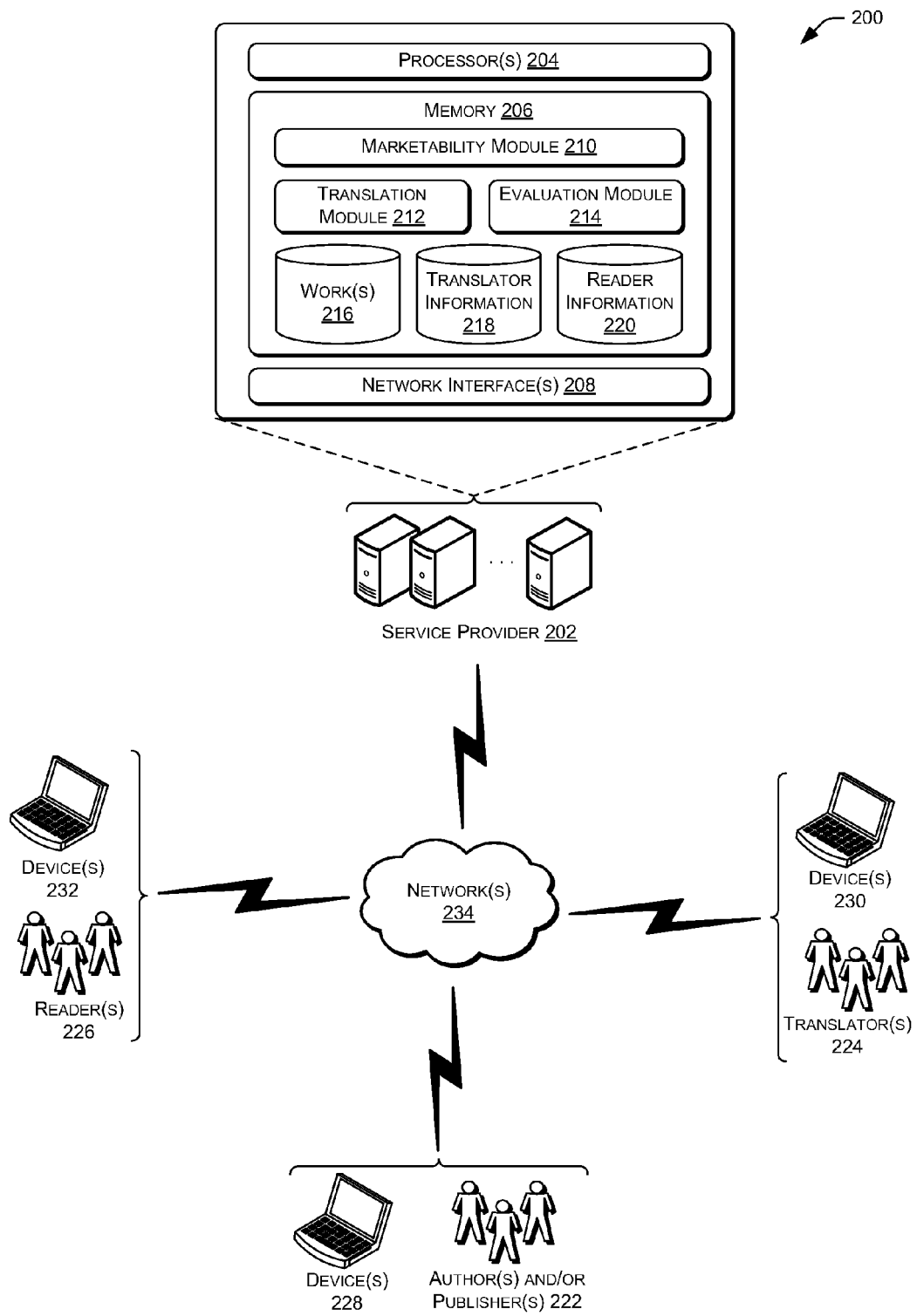
FIG. 2 illustrates an example system to obtain a translation a work from one or more translator of a specified level of experience, obtain feedback from one or more readers concerning the translated work, and determine whether to proceed with a complete translation of the work.

FIG. 2 illustrates an example system 200 to obtain a translation of a work from one or more translator of a specified level of experience (e.g., sample translation), obtain feedback from one or more readers concerning the translated work, and determine whether to proceed with a complete translation of the work. In particular, the system 200 includes a service provider 202 that may include one or more computing devices, such as one or more servers, laptop computers, desktop computers, smart phones, electronic reader devices, mobile handsets, personal digital assistants (PDAs), portable navigation devices, portable gaming devices, tablet computers, portable media players, other client devices, and the like. In some instances, the one or more computing devices may be implemented in cluster, farm or data center, cloud computing environment, or a combination thereof.

The service provider 202 is equipped with one or more processors 204, memory 206, and one or more network interfaces 208. The memory 206 may be configured to store data and one or more software and/or firmware modules, which are executable on the one or more processors 204 to implement various functions. In particular, the memory 206 may store a marketability module 210 to receive works from authors and/or publishers, determine a marketability of the works, and/or determine whether to proceed to obtaining a translation of the works from one or more translators of a specified level of experience (e.g., sample translation).

The memory 206 may also store a translation module 212 to provide (e.g., send) a work or portion of a work to a translator, receive a translated work or portion of the work from the translator, provide (e.g., send) the translated work or portion of the work to a reader, receive feedback from the reader, and/or determine whether to proceed with a complete translation of the work. The memory 206 may also store an evaluation module 214 to evaluate translators, updated information associated with the translators, and/or reward the translators.

Further, the memory 206 may store one or more works 216, translator information 218, and/or reader information 220 to be utilized by the marketability module 210, translation module 212, and/or evaluation module 214. The one or more works 216 may be provided by one or more rights holders of the works, such as authors, publishers, agents and the like. In the illustrated example, the rights holders are represented as authors and/or publishers 222, which may provide translated and/or non-translated versions of the one or more works 216. In some instances, a translated work may indicate a translator that performed the translation.

The translator information 218 may comprise information about one or more translators 224, such as a sample work written by a translator, a resume associated with a translator, a native language of a translator, a language that a translator may be capable of translating into and/or out of, an experience level of a translator (e.g., experienced, inexperienced, tier-level, etc.), general profile information (e.g., location, name, etc.), a rating of a translator, information regarding a computing device associated with a translator (e.g., computing device identification information), and so on.

Meanwhile, the reader information 220 may include information about one or more readers 226, such as general profile information (e.g., location, name, etc.), a rating of a reader, information regarding a computing device associated with a reader (e.g., computing device identification information), information about previous reviews of works (e.g., a number of previous reviews, a regularity of performing reviews, etc.), and so on.

The memory 206 (and all other memory described herein) may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves.

Meanwhile, the system 200 also includes the one or more authors and/or publishers 222. The one or more authors and/or publishers 222 may provide works to the service provider 202 and may be associated with one or more computing devices 228. The computing devices 228 may include one or more servers, laptop computers, desktop computers, smart phones, electronic reader devices, mobile handsets, personal digital assistants (PDAs), portable navigation devices, portable gaming devices, tablet computers, portable media players, other client devices, and the like.

The system 200 also includes the one or more translators 224 to translate one or more works. The one or more translators 224 may comprise inexperienced translators. The one or more translators 224 may be associated with one or more computing devices 230, such as one or more servers, laptop computers, desktop computers, smart phones, electronic reader devices, mobile handsets, personal digital assistants (PDAs), portable navigation devices, portable gaming devices, tablet computers, portable media players, other client devices, and the like.

The system 200 includes the one or more readers 226 to review one or more translated works and/or provide feedback regarding the one or more translated works. The one or more readers 226 may similarly be associated with one or more computing devices 232, such as one or more servers, laptop computers, desktop computers, smart phones, electronic reader devices, mobile handsets, personal digital assistants (PDAs), portable navigation devices, portable gaming devices, tablet computers, portable media players, other client devices, and the like.

The service provider 202, one or more authors and/or publishers 222, one or more translators 224, and/or one or more readers 226 may communication with each other over one or more networks 234. The one or more networks 234 may include any one or combination of multiple different types of networks, such as cellular networks, wireless networks, Local Area Networks (LANs), Wide Area Networks (WANs), and the Internet.

Example Process

Figure 3A:
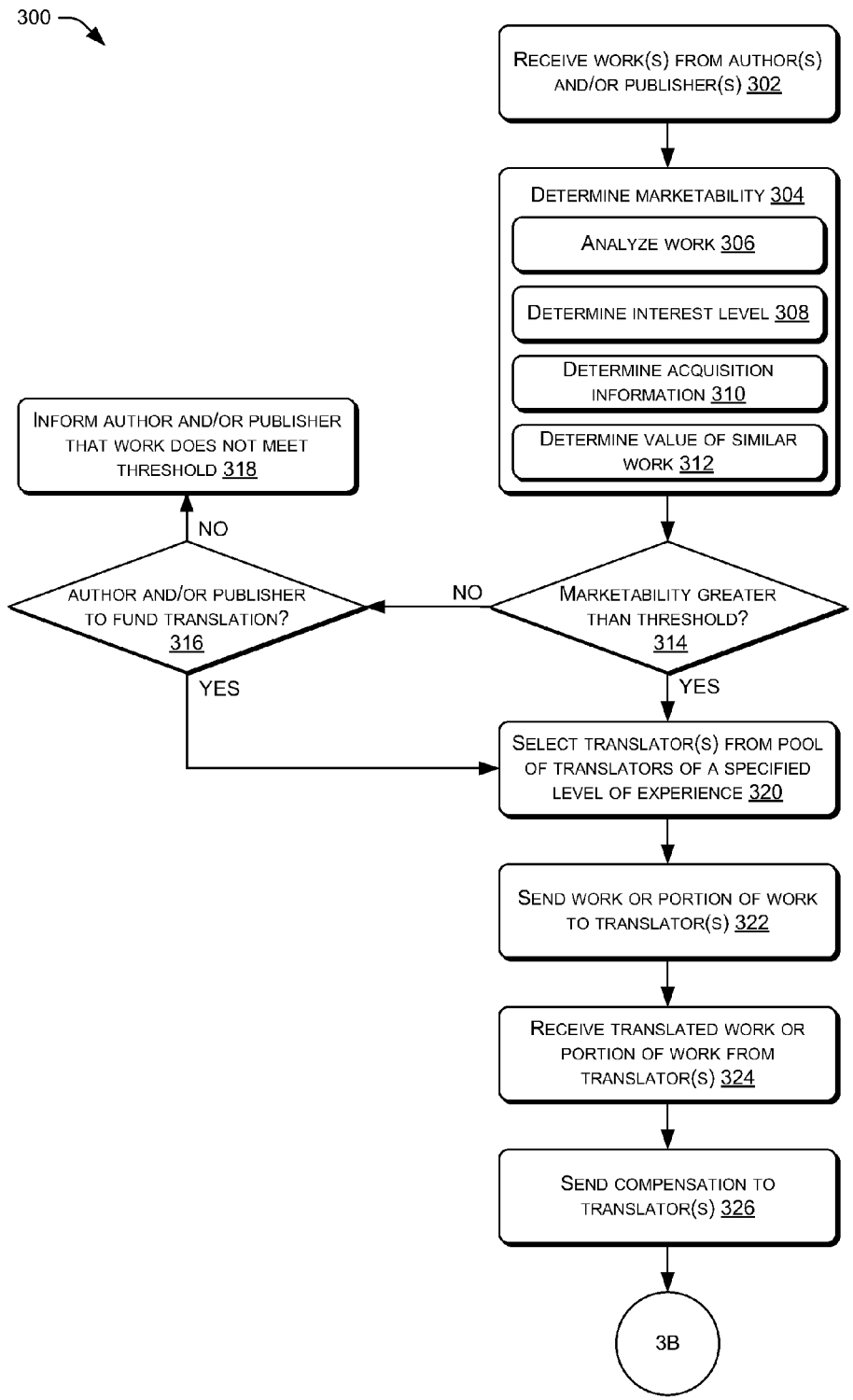
FIGS. 3A-3C illustrate a flow diagram of an example process to determine a marketability of a work, send the work to one or more translators of a specified level of experience, receive a translated work from the one or more translators, send the translated work to one or more readers, receive feedback from the one or more readers, and evaluate the one or more translators and/or determine whether to proceed with a complete translation of the work.
Figure 3B:
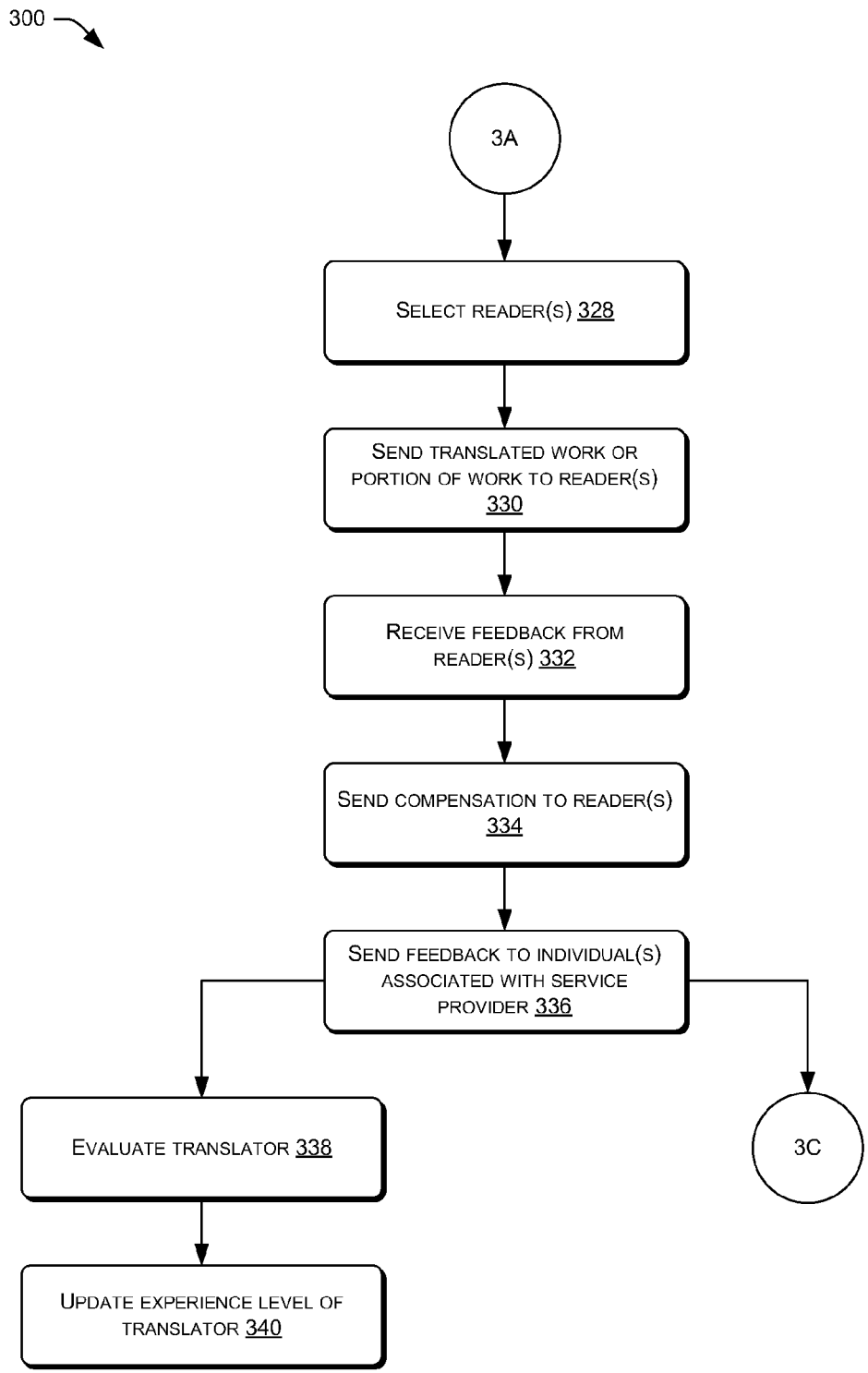
Figure 3C:
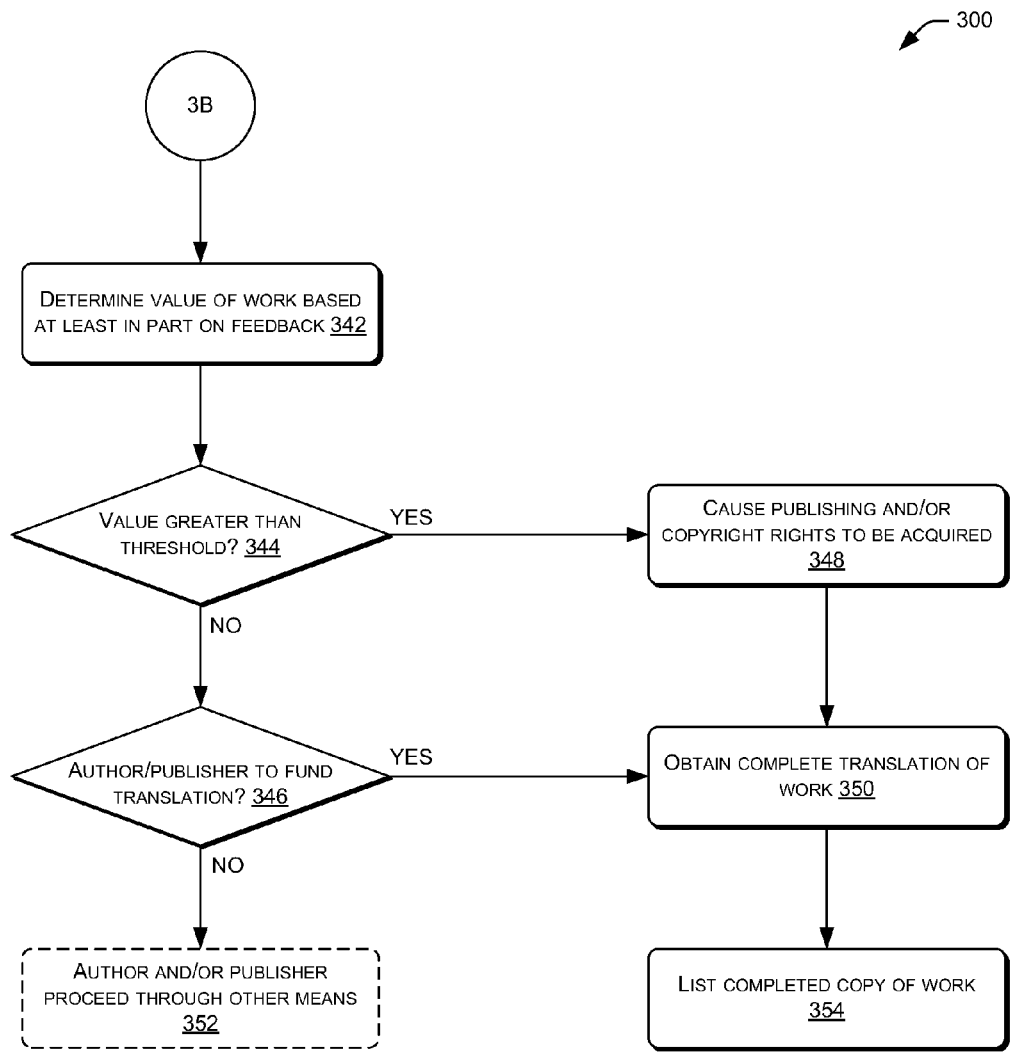

FIGS. 3A-3C illustrate a flow diagram of an example process 300 to determine a marketability of a work, send the work to one or more translators of a specified level of experience, receive a translated work from the one or more translators, send the translated work to one or more readers, receive feedback from the one or more readers, and evaluate the one or more translators and/or determine whether to proceed with a complete translation of the work. For ease of illustration process 300 may be described as being performed in the system 200 of FIG. 2. For example, one or more of the individual operations of the process 300 may be performed by the service provider 202. However, the process 300 may be performed in other architectures, and the architecture 200 may be used to perform other processes.

The process 300 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 300 includes an operation 302 for receiving one or more works from one or more authors and/or publishers. The process 300 also includes an operation 304 for determining a marketability of a work. The marketability of the work may indicate a likelihood of acquisitions of the work in one or more markets. For example, the operation 304 may include an operation 306 for analyzing the work (e.g., determining syntax of the work, determining a number of words per sentence, line, paragraph, or page, determining a complexity level of words or phrases used in the work, etc.). The operation 304 may also include an operation 308 for determining an interest level for a genre, author, and/or publisher associated with the work, an operation 310 for determining acquisition information associated with the work, and/or an operation 312 for determining a value of another work that has a threshold number of similarities to the work. Here, the marketability of the work may be based at least in part on one or more of the outputs from the operations 306-312.

The process 300 also includes an operation 314 for determining whether the marketability of the work is greater than a threshold. When the operation 314 determines that the marketability of the work is not greater than a threshold, the process 300 may proceed to an operation 316 for determining whether the author and/or publisher associated with the work will fund translation of the work through one or more translators of a specified level of experience (e.g., inexperienced translators).

When the operation 316 determines that the author and/or publisher will not fund the translation (e.g., sample translation), the process 300 may proceed to an operation 318 for informing the author and/or publisher that the work does not meet a threshold level of marketability to proceed. When the operation 316 determines that the author and/or publisher will fund the translation (e.g., sample translation), the process 300 may proceed to an operation 320. Alternatively, when the operation 314 determines that the marketability of the work is greater than a threshold, the process 300 may proceed to the operation 320.

The operation 320 may select one or more translators from a pool of translators of a specified level of experience (e.g., inexperienced translators). The selection may be based at least in part on a quality of a sample work written by a translator, a resume associated with the translator, a date when the translator will be able to translate the work or portion of the work, a compensation requested by the translator for translating the work or portion of the work, a recommendation from one or more translators of a higher level of experience than the translator, a native language of the translator, a language that the translator may translate into and/or out of, and so on.

The process 300 may also include an operation 322 for sending (e.g., providing) the work or portion of the work to one or more translators. In some instances, a portion of the work may be sent to the one or more selected translators of the operation 320. The operation 322 may include making the work or portion of the work available through, for example, an online site, a notification (e.g., email, text message, etc.), and so on. In some instances, the operation 322 includes sending the work or portion of the work to a computing device associated with a translator.

The process 300 may include an operation 324 for receiving a translated work or portion of the work (e.g., sample translation) from one or more translators. The process 300 may also include an operation 326 for sending (e.g., providing) compensation to the one or more translators that translated the work or portion of the work. In some instances, the compensation may include a standard fee that is previously established for translations by inexperienced translators and/or translations of a particular size.

In FIG. 3B, the process 300 may include an operation 328 for selecting one or more readers to provide the translated work or portion of the work to. For example, the operation 328 may select a number of readers from an established pool of readers, such as readers that regularly review works. Additionally, or alternatively, the operation 328 may select any number of users of an online site. The process 300 may also include an operation 330 for sending (e.g., providing) the translated work or portion of the work to one or more readers. In some instances, the translated work or portion of the work is sent to the one or more selected readers of the operation 328. The one or more readers may read and/or review the translated work or portion of the work.

The process 300 may include an operation 332 for receiving feedback from the one or more readers. The feedback may include comments, annotations, consumption data, and so on. The process 300 may also include an operation 334 for sending (e.g., providing) compensation to the one or more readers. In some instances, the operation 334 is performed after feedback is received from the one or more readers. For example, the compensation may be sent after the one or more readers complete a survey for the translated work or portion of the work. The compensation may include, for example, a voucher (e.g., a voucher code), attribution, a gift card, and/or reputation points.

The process 300 may also include an operation 336 for sending (e.g., providing) the feedback to one or more individuals associated with a service provider, such as an editor, reviewer, and the like. The process 300 may include an operation 338 for evaluating a translator based at least in part on the feedback. In some instances, the operation 338 may be performed at least in part by the one or more individuals associated with the service provider. The process 300 may also include an operation 340 for updating an experience level of a translator based at least in part on the evaluation. For example, a translator may move up a tiered system of experience levels. In some instances, the translator may move up from an inexperienced level to an experienced level.

In FIG. 3C, the process 300 includes an operation 342 for determining a value of the work based at least in part on the feedback. The determination may also be based on one or more other factors, such as an analysis of the work, interest level for a genre, author, and/or publisher associated with the work, previous acquisitions of the work, and/or a value of another work that is similar to the work. In some instances, the operation 342 may be performed at least in part by one or more individuals associated with a service provider.

The process 300 may also include an operation 344 for determining whether the value determined in the operation 342 is greater than a threshold (e.g., determine whether to obtain a complete translation of the work). When the operation 344 determines that the value is not greater than the threshold, then the process 300 may proceed to an operation 346. Alternatively, when the operation 344 determines that the value is greater than the threshold, then the process 300 may proceed to an operation 348. Here, a service provider and/or an entity associated with the service provider may fund the complete translation.

At 346, a determination is made as to whether an author and/or publisher will fund a complete translation of the work. Here, the author and/or publisher may be given the opportunity to continue and obtain a complete translation through the service provider. At 346, the author and/or publisher may be informed that the service provider and/or an entity associated with the service provider will not fund the complete translation of the work (e.g., information regarding a decision on funding a complete translation may be sent).

When the operation 346 determines that the author and/or publisher will fund a complete translation, then the process 300 may proceed to an operation 350. When the operation 346 determines that the author and/or publisher will not fund a complete translation, then at 352, the author and/or publisher may proceed through other means to obtain a complete translation of the work, if desired by the author and/or publisher. For example, the author and/or publisher may request a complete translation of the work through an online marketplace (e.g., an online community where authors, translators, publishers, reviewers, readers, and/or other individuals can interact). In some instances, the operation 350 is not performed by the service provider.

The operation 348 may cause publishing and/or copyright rights of the work to be acquired. Here, a service provider may acquire publishing and/or copyright rights of the work from the author and/or publisher. The operation 350 may obtain a complete translation of the work. In some instances, the complete translation is obtained through one or more experienced translators. Further, in some instances the complete translation is obtained through the one or more translators that initially translated a portion of the work. Here, the one or more translators may be rewarded with performing the complete translation based at least in part on the evaluation of the operation 338.

The process 300 may also include an operation 354 for listing one or more completed copies of the work. For example, the complete translation of the work may be listed on an online site or otherwise made available. In some instances, the online site may be associated with the service provider.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A method comprising:
    sending, by one or more computing devices, a portion of a work to a second computing device associated with a translator, the translator having an experience level for translating that is less than a predetermined experience level;
    receiving, at the one or more computing devices, a translated portion of the work from the translator;
    sending, by the one or more computing devices, the translated portion of the work to an electronic book (eBook) reading device;
    receiving, at the one or more computing devices and from the eBook reading device, consumption data associated with the translated portion of the work, the consumption data including one or more of a reading duration, a reading rate, or starting and stopping points for reading;
    assigning, based at least in part on the consumption data, a value to the work; and
    determining, based at least in part on the consumption data, an updated experience level of the translator.

2. The method of claim 1, further comprising determining the marketability of the work by at least one or more of analyzing syntax of the work, determining a number of words per sentence, line, paragraph, or page, determining a complexity level of words or phrases utilized in the work, or receiving feedback from the reader.

3. The method of claim 2, wherein the determining the marketability of the work includes determining one or more of an interest level for a genre of the work, an interest level for an author of the work, or an interest level for a publisher of the work.

4. The method of claim 2, wherein the determining the marketability of the work includes:
    determining a number of previous purchases of the work.

5. The method of claim 2, wherein the determining the marketability of the work includes determining a similarity score between the work and a translated work and determining a value of the translated work.

6. The method of claim 1, further comprising:
    determining whether to translate an additional portion of the work based at least in part on the consumption data.

7. A system comprising:
    one or more processors; and
    memory, communicatively coupled to the one or more processors, storing one or more modules executable by the one or more processors to perform operations including:
        sending at least a portion of a work to a translator of a specified level of experience;
        receiving a translation of the at least the portion of the work from the translator, the translation of the at least the portion being a translation of less than the entire work;

19 sending the translation to an electronic book (eBook) reader device associated with a reader;

receiving, from the eBook reader device, consumption statistics regarding the translation, the consumption statistics including one or more of a reading duration, a reading rate, or starting or stopping points for reading;

determining, based at least in part upon the consumption statistics, a completion event;

presenting, on the eBook reader device and based at least in part on the completion event, a survey regarding the translation;

receiving, from the eBook reader device, a completed survey; and determining, based at least in part on the consumption statistics and the completed survey, to cause an additional portion of the work to be translated.

8. The system of claim 7, wherein the operations further include:

causing the additional portion of the work to be translated.

9. The system of claim 8, wherein the translator comprises a first translator and the causing the additional portion of the work to be translated includes causing the additional portion of the work to be translated by a second translator that has a higher level of experience than the first translator.

10. The system of claim 9, wherein the translator comprises a first translator and the operations further include:

causing, upon completion of translating the additional portion of the work, compensation to be sent to a second translator, the compensation including at least one of a standard fee, a voucher to obtain another translated work, a voucher to obtain a completed translation of the work, attribution in the completed translation of the work, a gift card, or reputation points.

11. The system of claim 8, wherein the operations further include:

causing, upon determining to cause the additional portion of the work to be translated, at least one of publishing rights of the work or copyright rights of the work to be acquired from at least one of the author or an individual associated with the author.

12. The system of claim 7, wherein the operations further include:

selecting the translator from a plurality of translators, each translator of the plurality of translators having registered as being associated with the specified level of experience and being at least one of a translator that has performed less than a threshold number of translations, a translator that has been translating for less than a threshold period of time, or a translator that lacks specified training or certification.

13. The system of claim 7, wherein the operations further include:

selecting the translator based at least in part on a quality of a sample work written by the translator, a resume associated with the translator, a date when the translator will complete the translation, a compensation requested by the translator for translating the portion of the work, or a recommendation from an individual having a threshold level of experience in publishing, an individual for an entity, or a second translator of a higher level of experience than the translator.

14. The system of claim 7, wherein the sending the translation to the eBook reader device associated with the reader includes making the translation available to a reader that has reviewed another work.

20

15. The system of claim 7, wherein the operations further include:

selecting the reader based at least in part on a review prepared by the reader regarding another work.

16. The system of claim 7, wherein the sending the translation to the eBook reader device associated with the reader includes sending the translation over a computer network.

17. The system of claim 7, wherein the survey indicates a translation accuracy of at least a portion of the translation.

18. The system of claim 7, wherein the operations further include:

causing compensation to be sent to the reader upon receiving the feedback from the reader, the compensation including a standard fee, a voucher to obtain another translated work, a voucher to obtain a completed translation of the work, attribution in the completed translation of the work, a gift card, or reputation points.

19. One or more non-transitory computer-readable storage media storing computer-readable instructions that, when executed, instruct one or more processors to perform operations comprising:

sending a portion of a work to a translator having an experience level for translating into a language that is less than a predetermined experience level;

receiving a translation of the portion of the work from the translator;

sending the translation to an electronic book (eBook) reader device;

receiving consumption statistics from the eBook reader device regarding the translation, the consumption statistics comprising one or more of a reading rate, a reading duration, or a stopping point for reading;

causing a survey to be displayed on the eBook reader device, the survey associated with the translation;

receiving a completed survey from the eBook reader device; and causing the translator to be evaluated based at least in part on the consumption statistics and the completed survey.

20. The one or more non-transitory computer-readable storage media of claim 19, wherein the sending the portion of the work to the translator includes sending the portion of the work to a translator that is experienced to translate works of a level of complexity associated with the work.

21. The one or more non-transitory computer-readable storage media of claim 19, wherein the completed survey includes an annotation indicating an accuracy of at least a portion of the translation.

22. The one or more non-transitory computer-readable storage media of claim 19, wherein:

the causing the translator to be evaluated results in creation of an evaluation for the translator, the evaluation indicating that the translation of the portion of the work satisfies one or more criteria, and the operations further comprise:

causing an additional portion of the work to be translated by the translator based at least in part on the evaluation of the translator.

23. The one or more non-transitory computer-readable storage media of claim 19, wherein the sending the portion of the work to the translator includes sending a beginning portion of the work defined at least partly by one or more breaks in the work.

24. The one or more non-transitory computer-readable storage media of claim 19, wherein:

the causing the translator to be evaluated results in creation of an evaluation for the translator, and the operations further comprise:

updating, based at least in part on the evaluation of the translator, the experience level of the translator to an experience level that is greater than the predetermined experience level.

25. The one or more non-transitory computer-readable storage media of claim 19, wherein the survey indicates an interest level of the reader in the translation.

26. The one or more non-transitory computer-readable storage media of claim 19, wherein the operations further comprise:
    sending compensation to the translator upon receiving the translation from the translator.

27. The method of claim 1, further comprising:
    providing, by the one or more computing devices, an online marketplace that displays one or more works that are available to be translated; and
    receiving, by the one or more computing devices, one or more offers to translate the one or more works that are available to be translated.

28. The method of claim 27, further comprising providing, through the online marketplace, the translated portion of the work for one or more readers to consume.

29. The method of claim 28, further comprising determining, based at least in part on a number of readers that consume the translated portion, a value of the work.

* * * * *